E. D. & R. Gird,
Budding Knife.
N° 34,328.    Patented Feb. 4, 1862.
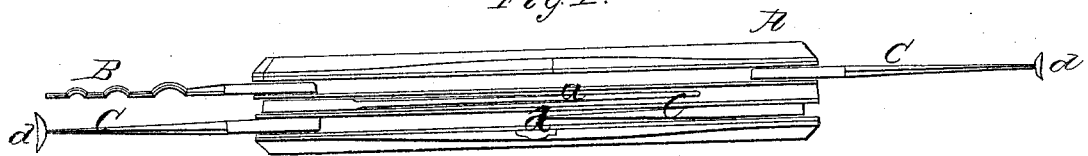
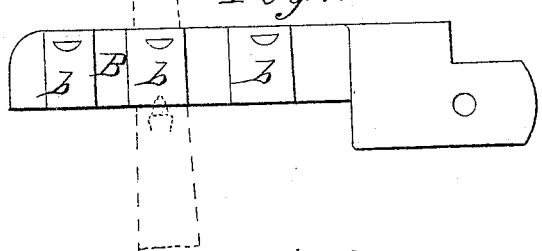
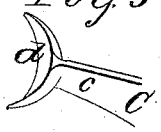
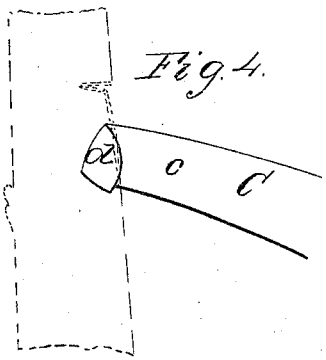
Witnesses
J. W. Coombs
G. W. Reed
Inventors
Edward D. Gird
Richard Gird
per Munn & Co
Attorneys

UNITED STATES PATENT OFFICE.

EDWARD D. GIRD, OF CEDAR LAKE, NEW YORK, AND RICHARD GIRD, OF HEALDSBURG, CALIFORNIA, ASSIGNORS TO THEMSELVES, AND THOS. J. BEDWELL, OF HEALDSBURG, CALIFORNIA.

IMPROVED BUDDING-KNIFE.

Specification forming part of Letters Patent No. 34,328, dated February 4, 1862.

*To all whom it may concern:*

Be it known that we, EDWARD D. GIRD, of Cedar Lake, in the county of Herkimer and State of New York, and RICHARD GIRD, of Healdsburg, in the county of Sonoma and State of California, have invented a new and Improved Budding-Knife; and we do hereby declare that the following is a full, clear, and exact description of the same, reference being had to the accompanying drawings, making a part of this specification, in which—

Figure 1 is a front view of our invention, with some of the blades in an open state; Fig. 2, an enlarged detached view of the blade by which the buds are cut from the limbs; Fig. 3, an edge view of the same; Fig. 4, an enlarged detached side view of the blade by which the cut is made in the stock to receive the bud. Fig. 5 is an enlarged detached perspective view of the same.

Similar letters of reference indicate corresponding parts in the several figures.

The object of this invention is to obtain an implement by which trees may be budded or inoculated with far greater facility and with much greater success than hitherto.

The invention consists in the employment or use of a blade or cutter provided with curved portions for the purpose of cutting the buds from the limb, and also in the employment or use of a T-shaped cutter for the purpose of making the incision in the stock to receive the bud, as hereinafter fully shown and described.

To enable those skilled in the art to fully understand and construct our invention, we will proceed to describe it.

A represents a knife, the handle of which may be constructed in the usual way for pocket-knives. This knife is provided with a large blade $a$, which may be of the same form as the large blade of pocket-knives and arranged in the handle in the ordinary way.

B is a blade which has a series of curved portions $b$ of different sizes. These curved portions are sections or segments of a circle and are designed to correspond to different-sized limbs from which the buds are to be cut. The construction of this blade will be fully understood by referring to Figs. 2 and 3.

C C C are three blades, which are fitted in the handle in the ordinary way. These blades have their main parts $c$ shaped like the small blades of an ordinary pocket or pen knife, and each of these blades is provided at its point with a curved spur $d$, which is shown clearly in Fig. 5. The spurs $d$ are attached centrally to the ends of their blades, their concave sides being outward, as shown clearly in Fig. 5, the spurs and the ends of their blades being of T form or approximately thereto. The spurs $d$ are forged on the ends of the blades C C C. The blades C C C are all provided with similar spurs $d$, merely varying in size to suit different-sized stocks.

The implement is used as follows: The buds are cut from the limb by means of the blade B, the curved portions $b$ removing the bud without taking any of the wood with it. This is an important point, for by using an ordinary knife-blade a portion of the wood of the limb is removed with the bud, and the wood requires to be afterward detached from the bud, an operation which, even when carefully performed, often destroys the bud, the eye of the latter frequently becoming detached with the wood. The T-shaped incision in the bark of the stock is made by any of the blades C C C. The spur $d$ of the blade is first pressed into the stock, so as to penetrate the bark, and the blade is then drawn downward, the part $c$ of the blade making the vertical cut and the spur $d$ detaching the bark from the wood as the blade is drawn downward. The bud may therefore be readily inserted in the cut or incision made in the bark.

The spur $d$, it will be seen, performs two functions—to wit, making the upper transverse cut in the bark and separating the bark from the wood during the downward movement of the blade and while the latter is making the vertical cut.

By this arrangement trees may be very rapidly budded and with great success. The invention has been practically tested, and trees budded by it have in almost every instance had their buds grow thriftily.

Having thus described our invention, what we claim as new, and desire to secure by Letters Patent, is—

1. The employment or use of the blade B, provided with one or more curved portions b, substantially as shown, for the purpose of cutting the buds from the limbs.

2. A blade provided with a spur d at its end, substantially as shown, for the purpose of making the T-shaped incision in the side of the stock to receive the bud.

3. The combination of the blades B C, constructed substantially as shown, and fitted in a suitable handle, the whole forming a new and useful implement, for the purpose specified.

EDWARD D. GIRD.
RICHARD GIRD.

Witnesses:
PHILANDER RENAY,
F. M. CARRAN.